Feb. 16, 1965   F. S. HUMMEL   3,169,910
NUCLEAR REACTOR FUELLING MACHINE
Filed Feb. 15, 1963   3 Sheets-Sheet 1
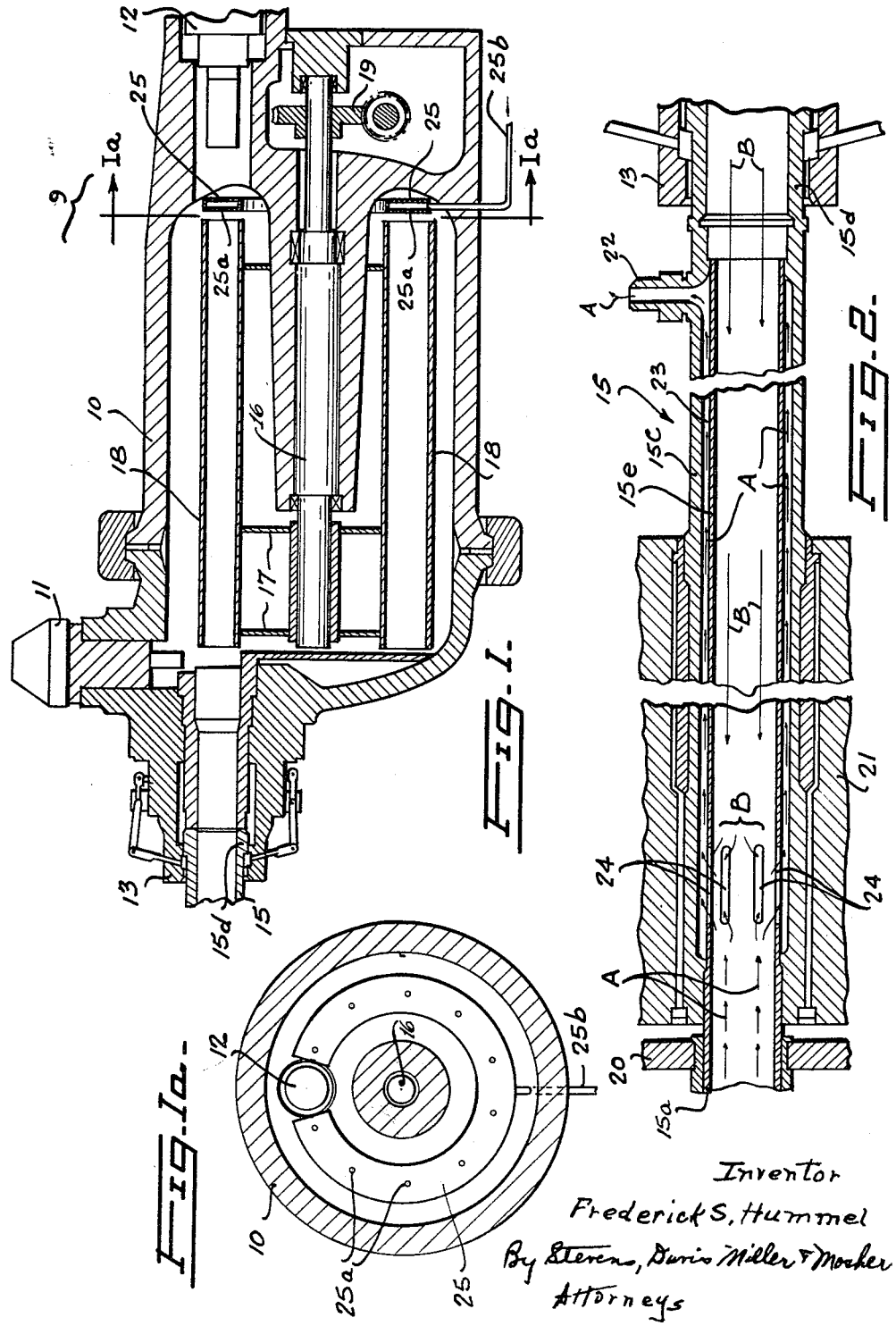
Inventor
Frederick S. Hummel
By Stevens, Davis, Miller & Mosher
Attorneys

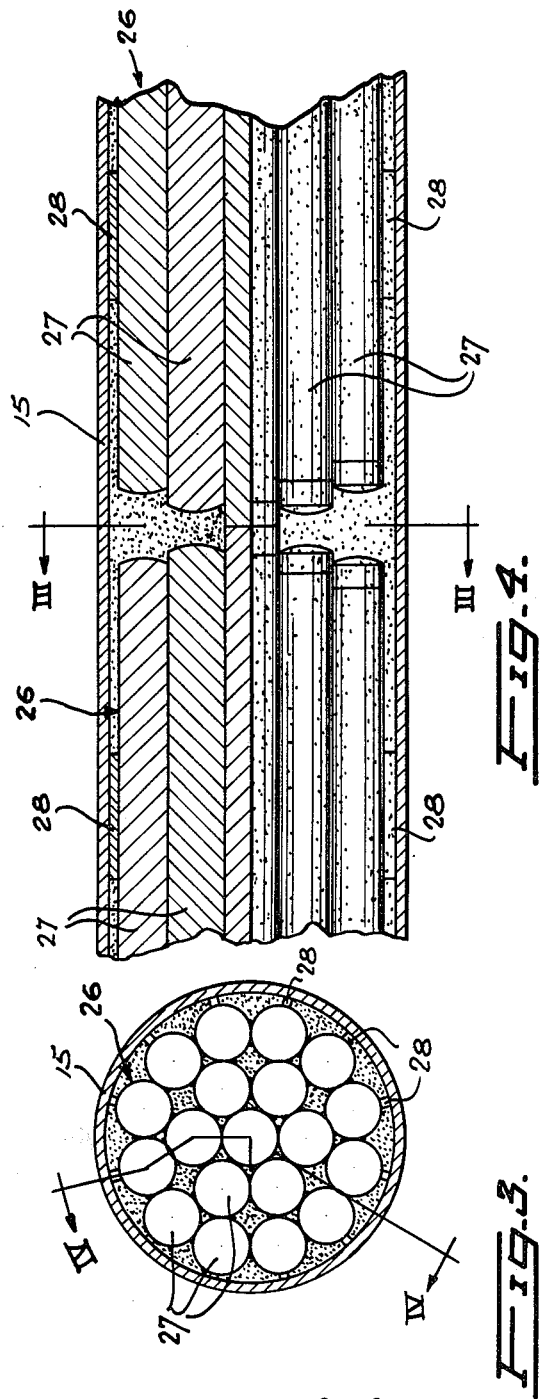

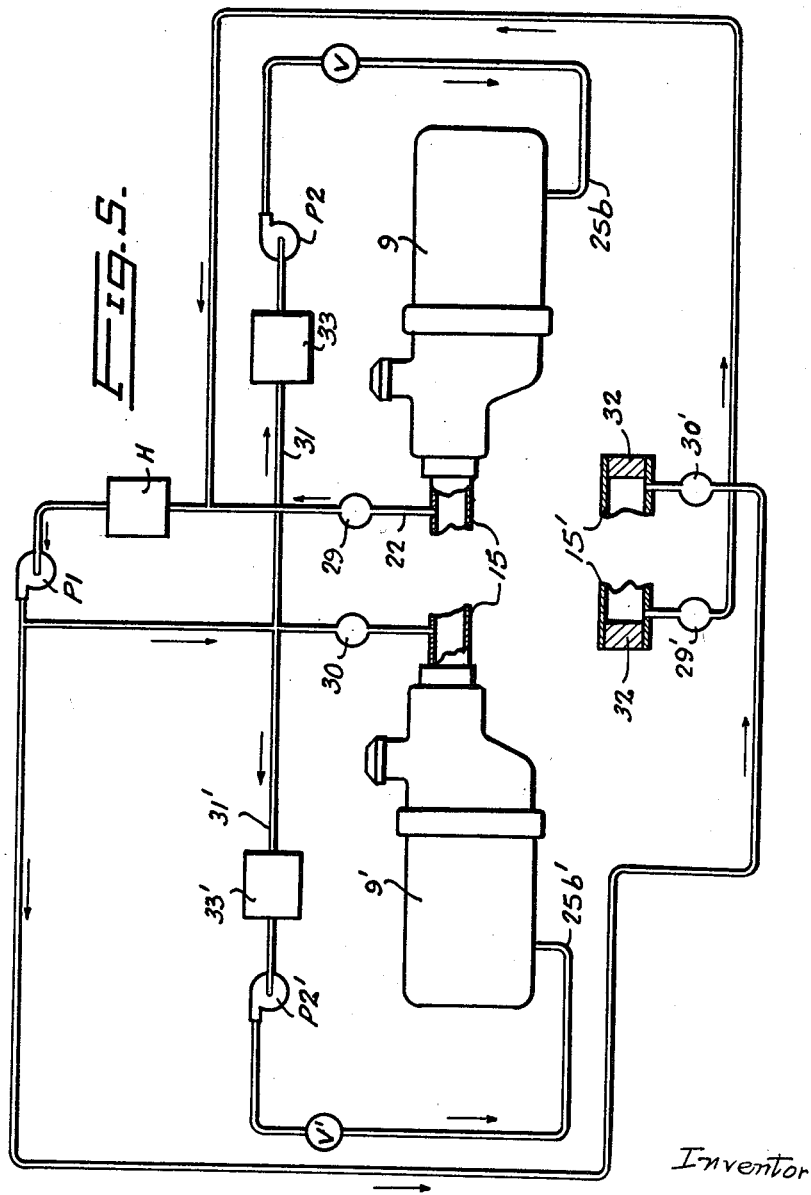

3,169,910
NUCLEAR REACTOR FUELLING MACHINE
Frederick S. Hummel, Islington, Ontario, Canada, assignor to Atomic Energy of Canada Limited, Ottawa, Ontario, Canada, a corporation
Filed Feb. 15, 1963, Ser. No. 258,701
Claims priority, application Canada, Oct. 10, 1962, 859,822
6 Claims. (Cl. 176—31)

This invention relates to fuelling machines for nuclear reactors.

A typical nuclear reactor, in association with which the fuelling machine to be described below could conveniently be used, has a large number of horizontal tubes each containing a series of fuel bundles and each arranged to convey liquid coolant under pressure past such bundles for the extraction of heat. Such an arrangement is conventional. Since the nuclear fuel in the bundles is slowly consumed, fresh bundles are loaded into the tubes on one side of the reactor in accordance with a prearranged programme, while used bundles are withdrawn from the opposite ends of the tubes at the other side of the reactor. Essentially similar machines are employed for loading and unloading.

Whether performing a loading or unloading function, each machine is required firstly to form an extension of a chosen reactor fuel tube and then to disengage a pressure sealing plug from the end of such tube. After equalizing the pressure in the two machines with that of the coolant in the tube, the plugs in each end of the tube are removed for a loading operation to commence. Both machines include a ram and, while the ram of the unloading machine is pushed up into engagement with the end of the last fuel bundle in the row (the bundle to be removed) to hold the row of bundles against movement out of the tube which may be induced by coolant flow, the ram of the loading machine is withdrawn, its magazine is indexed to position a new fuel bundle in line with the ram, and then the ram is forced forward to drive this bundle into the tube. At this stage of the operation, the ram of the unloading machine is withdrawn at a controlled rate to allow the row of bundles to move through the tube so that the last bundle is pushed out into the magazine of the unloading machine for indexing out of register with the ram and subsequent disposal. The ram of the unloading machine then returns to engage the next bundle in the row, which has now become the end bundle, and, in conjunction with the ram of the loading machine, pushes the row back again into a centrally located position in the reactor tube. One fresh bundle has thus been added at the loading end and one spent bundle has been removed at the unloading end. Finally, the plugs are replaced at each end of the tube, and the fuelling machines move into alignment with another tube to carry out a similar operation.

This description of the manner of operation of a pair of fuelling machines has deliberately been made brief and general. In practice the sequence of steps involved in a refuelling operation is quite lengthy, but a detailed description of all these steps would be out of place in the present specification.

A necessary preliminary to the removal of the sealing plugs from the ends of a reactor tube is equalization of liquid pressure in the two machines with that of the liquid coolant in the tube. After this equalization has taken place and the plugs have been removed, a continuous liquid path extends from one fuelling machine along the tube to the other fuelling machine. The normal coolant flow into and out of the tube from input and output headers must be maintained during a refuelling operation, as many of the fuel bundles in the tube remain within the reactor vessel and continue to generate heat. This coolant, or at least the main body of it, does not traverse the fuelling machines. It enters and leaves the tube through feeder connections situated near the respective ends of the tube. There is, however, some tendency once the plugs have been removed for coolant to pass from the tube into one or other of the fuelling machines, especially into the fuelling machine situated at the downstream end of the tube.

The direction of coolant flow is preferably arranged to be opposite in adjacent tubes. The fuelling machines are preferably alternated in their functions, that is as loading and unloading machines, so that the machine which is situated beyond the downstream end of each tube acts as an unloading machine for that tube. This procedure may be modified, however, to unload at the upstream end of a tube, if conditions require, e.g. to retrieve a faulty fuel bundle. At the downstream tube ends the coolant achieves the highest temperature of its closed cycle through the tubes and an external heat exchanger in which the heat generated in the reactor is extracted and made to do useful work. Any diversion of hot coolant from an end of a tube into a fuelling machine connected to such tube end is undesirable, because of the thermal problems is produces. The coolant will typically be at a temperature of the order of 450° to 500° F. on entering the tubes and 550° to 600° F. on leaving the tubes. If liquid at these temperatures were to circulate in a fuelling machine originally at a substantially lower temperature, the rapid heating of the machine would cause undesirably high thermal stresses in the machine. Some preheating of the fuelling machine and the liquid coolant therein will normally be adapted (say up to 300° F.), but to preheat the machine to temperatures of the order of 450° to 600° F. would present many practical operating difficulties.

The object of the present invention is to provide means for ameliorating this undesirable effect. Such end is achieved by operating the fuelling machines at a substantially lower temperature than the coolant in the reactor tubes, and by providing means for checking circulation of hot coolant into the fuelling machines by causing an auxiliary stream of comparatively cool liquid coolant to flow from each machine into the reactor tube coupled thereto, this auxiliary stream acting to inhibit flow of the hotter coolant from the tube into the machine.

One manner of carrying the invention into practice is illustrated diagrammatically and by way of example in the accompanying drawings.

FIGURE 1 shows a central section of the magazine and snout portion of a fuelling machine;

FIGURE 1A is a section on the line IA—IA in FIGURE 1;

FIGURE 2 is a view on an enlarged scale of a part of a reactor tube affixed to the snout of FIGURE 1;

FIGURE 3 is a cross-section drawn on a further enlarged scale of a fragment of reactor tube showing coolant fluid and a fuel bundle therein, this view being taken on the line III—III in FIGURE 4;

FIGURE 4 is a section on IV—IV in FIGURE 3 showing two abutting fuel bundles in the tube; and FIGURE 5 is a schematic diagram of the overall operation.

For fuller illustration of a complete fuelling machine reference may be made to F. S. Hummel, United States patent application Serial No. 258,700, filed February 15, 1963. FIGURE 1 of the present drawings shows the magazine housing 10 of an unloading machine 9 also provided with a sensing and stop mechanism 11 of the type described in F. S. Hummel, United States patent application Serial No. 258,742, filed February 15, 1963, and with a ram mechanism 12 of the type described in F. S. Hummel United States patent application Serial No. 177,567, filed March 5, 1962. The magazine housing 10 terminates in a snout 13 for securing to the end fitting 15d of a reactor tube 15. Details of the mechanisms involved in establishing this connection and the manner of subsequent removal of the end plug from the tube 15 by means of the ram mechanism 12 are provided in such other applications.

For clarity of illustration, FIGURES 1 and 2 show the tube 15 and magazine housing 10 empty of fuel bundles which will not, of course, be the true operating condition. The magazine housing 10 houses a shaft 16 supporting a framework 17 on which an annular series of mutually parallel magazine tubes 18 is arrayed. Shaft 16 is indexed by a drive mechanism 19 to align a selected one of such tubes 18 coaxially with the ram mechanism 12 and the passageway along the snout 13 and hence with the tube 15.

FIGURE 2 shows more detail of the reactor tube 15, including a portion 15a extending through the calandria 20 of the reactor, a portion 15b extending through the end shield 21 of the reactor, and a projecting portion 15c terminating in the end fitting 15d. Tube portion 15c includes a transversely projecting output feeder connection 22 which communicates with elongated ports 24 in the tube portion 15b by annular passageway 23 defined between the tube 15 and an inner liner 15e. Normal coolant flow from tube 15 passes through ports 24, along passageway 23 and out the feeder connection 22 to an output header 29 (FIGURE 5), as indicated by arrows A in FIGURE 2.

There will be a strong tendency for this hot coolant to set up a circulation along the liner 15e inside the tube portions 15b and 15c and thence into the fuelling machine 9. This tendency is greater at the downstream end of the tube 15, because of the direction of travel of the coolant, but exists at both ends as a result of convection currents set up by the temperature difference.

In accordance with the present invention, this tendency is inhibited by a reverse stream of an auxiliary body of the same liquid coolant, such auxiliary stream being indicated by arrows B in FIGURE 2. Stream B mingles with the main stream A to pass out with it through ports 24, passageway 23 and connection 22, so as to cause stream A to flow virtually entirely through ports 24 and not continue along the tube 15 towards the fuelling machine 9.

Stream B is generated by an excess volume of coolant supplied to the machine 9 by a manifold 25 which has a series of jet-forming apertures 25a and is supplied with coolant through a conduit 25b. Stream B will be much smaller both in volume and velocity than stream A and will be maintained as small as possible compatible with achievement of the prime purpose of stream B, namely to inhibit the setting up of a circulation from the tube 15 into the fuelling machine 9. In practice, some circulating currents will be set up, but can be largely confined to the tube portions 15b and 15c by the existance of stream B. For this reason the length of the tube portion between ports 24 and the end fitting 15d is made comparatively great in relation to the diameter of the tube liner 15e, for example, a ratio of at least 5 to 1. In practice, a ratio nearer to 20 to 1 will be convenient to adopt. The larger this ratio can be made, having regard to economic and other design considerations, the smaller stream B can be made, while still achieving the same degree of inhibition of flow of hot coolant into the machine 9. Reference has been made to "inhibiting" this flow into the fuelling machine, rather than "preventing" it, because it is not outside the invention to allow a small proportion of such a flow to circulate in the fuelling machine. A stage may be reached when to increase the volume of stream B, or to increase the ratio between the distance from ports 24 to the end fitting 15d and the diameter of line 15e, to achieve more perfect operation, will become uneconomical.

Stream B is at a substantially lower temperature than stream A, which is an added reason why it is desirable to keep the dilution of mainstream A by auxiliary stream B to a minimum.

When considering FIGURES 1 and 2 it must be remembered that in practice the majority of the space in tubes 15 and 18 will be occupied by fuel bundles 26 abutting one another end to end and substantially filling the tubes in the manner shown in FIGURES 3 and 4. Both liquid streams will thus be restricted to travel around the outer edges and along the interstices of these bundles (the areas shown speckled in FIGURES 3 and 4).

Each bundle 26 is made up of a number of concentrically arranged, cylindrical, clad nuclear fuel rods 27 welded together along their abutting edges and provided with spacers 28 with which to rest on and slide along the inner tube surfaces. The centrally situated rods 27 are slightly longer than the remaining rods 27 to ensure end to end contact between these central rods. Such fuel bundle construction is conventional.

One manner of providing a source for stream B is illustrated in FIGURE 5 which shows output (downstream) headers 29 and 29′ passing hot coolant to main heat exchanger H for extraction of useful heat. After passing through exchanger H the coolant (at say 480° F.) is forced by pump P1 to complete its closed cycle by entering input headers 30 and 30′ and traveling once more along the reactor tubes 15 and 15′ to the output headers 29, 29′. Conduits 31 and 31′ lead from this portion of the coolant circuit through booster pumps P2 and P2′ and valves V and V′ to the conduits 25b and 25b′ of machines 9 and 9′. Coolers 33 and 33′ are provided in conduits 31, 31′ for cooling the coolant supplied to the fueling machines. The temperature of the coolant supplied to the fueling machines will depend on the degree of preheating desired in such machines, having regard to any heat generated in the machines by spent fuel bundles. The temperature of the machines can conveniently be in the range of 200° to 300° F.

I claim:

1. In a fuelling machine for a nuclear reactor having a snout for clamping onto a projecting end of a reactor tube to form a communicating continuation thereof, conduit and pump means for supplying liquid coolant from an exterior source to the interior of said machine at a location remote from said snout to generate a pressure of liquid coolant in said machine sufficient to cause a stream of said liquid coolant to flow from said machine into said tube to inhibit flow of coolant from said tube into said machine.

2. The combination of a nuclear reactor and a fuelling machine,
   (a) said reactor comprising
     (i) a plurality of fuel tubes having ends projecting from the reactor,
     (ii) plugs normally sealing said ends,
     (iii) and means for passing liquid coolant at a lower temperature into each tube adjacent an input end thereof and for withdrawing said coolant at a higher temperature from adjacent the other, output end thereof,
   (b) said fuelling machine comprising
     (iv) snout means for clamping on to a selected said tube end to form a communicating continuation of the selected tube,
     (v) means for removing the plug from said selected end,
     (vi) and conduit and pump means for feeding liquid coolant from an exterior source to the interior of said machine at a location remote from said snout means to generate a pressure of liquid coolant in said machine sufficient to cause a stream of said liquid to flow from the machine into said tube to inhibit flow of coolant from said tube into the machine.

3. The combination of claim 2, wherein the ratio between
   (a) the length of the portion of each tube between the tube end and the location adjacent such tube end at which said coolant is withdrawn therefrom, and
(b) the diameter of said portion
is at least as great as 5 to 1.
4. The combination of a nuclear reactor and a pair of fuelling machines,
  (a) said reactor comprising
    (i) a plurality of fuel tubes having ends projecting from the reactor,
    (ii) plugs normally sealing said ends,
    (iii) and means for passing liquid coolant at a lower temperature into each tube adjacent an input end thereof and for withdrawing said coolant at a higher temperature from adjacent the other, output end thereof,
  (b) said fuelling machines each comprising
    (iv) snout means for clamping on to a selected said tube end to form a communicating continuation of the selected tube,
    (v) means for removing the plug from said end,
    (vi) and conduit and pump means for feeding liquid coolant from an exterior source to the interior of said machine at a location remote from said snout means to generate a pressure of liquid coolant in said machine sufficient to cause a stream of said liquid to flow from the machine into said tube end to inhibit flow of coolant from the tube into the machine.
5. In a method of fuelling a nuclear reactor including the step of clamping the snout of a fuelling machine onto a projecting end of a reactor tube to form a communicating continuation thereof; and during the period of such communication causing an auxiliary stream of liquid coolant to flow continuously from said machine into said tube to inhibit flow of coolant from said tube into said machine, said auxiliary stream being at a lower temperature than the coolant in said tube.
6. In a method of fuelling a nuclear reactor the steps of
  (a) clamping the snout of a fuelling machine onto a projecting end of a reactor tube to form a communicating continuation thereof,
  (b) passing a main stream of liquid coolant along said tube towards said fuelling machine,
  (c) withdrawing said main stream of coolant from said tube at a location spaced inwardly from the tube end,
  (d) and causing an auxiliary stream of liquid coolant to flow from said machine into said tube to inhibit flow of said main stream from said tube into said machine,
  (e) said auxiliary stream being at a lower temperature than said main stream.

References Cited by the Examiner
UNITED STATES PATENTS 2,725,993  12/55  Smith _____ 204—193.39
2,736,696   2/56  Wigner _____ 176—52
2,853,625   9/58  Ohlinger _____ 176—32 X
2,855,114  10/58  Ohlinger _____ 176—32 X
2,870,075   1/59  Leverett et al. ____ 176—32
2,894,892   7/59  Zinn _____ 176—31

CARL D. QUARFORTH, Primary Examiner.
REUBEN EPSTEIN, Examiner.